June 15, 1965 E. W. C. RUSSELL 3,189,732

MEANS AND METHOD FOR PREPARING RECORD BEARING MEDIA

Filed May 2, 1962 2 Sheets-Sheet 1

INVENTOR
Edward W. C. Russell

BY Mauro & Lewis

ATTORNEYS

MEANS AND METHOD FOR PREPARING RECORD BEARING MEDIA

Filed May 2, 1962 2 Sheets-Sheet 2

INVENTOR
Edward W. C. Russell

BY Mauro & Lewis

ATTORNEYS

United States Patent Office 3,189,732
Patented June 15, 1965

3,189,732

MEANS AND METHOD FOR PREPARING RECORD BEARING MEDIA

Edward W. C. Russell, 2601 Foxhall Road NW., Washington 7, D.C.

Filed May 2, 1962, Ser. No. 191,922
10 Claims. (Cl. 235—61.12)

This invention relates to a device, apparatus and method for preparing record bearing media, in particular, the magnetic records described in my U.S. Patent No. 2,547,-838, granted April 3, 1951, and in my British Patents 655,357 and 770,455.

In said patents the record bearing medium (a card, tape, sheet, disc, or the like) is characterized by having a surface coating of magnetizable, or magnetized, material thereon, which surface is interrupted at selected code index points. The absence of the magnetic material at said index points, when the record is employed with suitable scanning equipment, produces electrical variations or impulses corresponding to the information recorded on the record.

In my patents I have suggested several methods of preparing such magnetic records, as by punching holes in the medium, including the magnetic coating, or by use of a masking material when applying the magnetic coating, or by use of stencils or by chemical removal, all of which accomplish the aforesaid object of making a record whereon there appear selected spaces or intervals devoid of magnetism.

According to the present invention, I now provide a simple device in the form of a plate, tag, or disc, formed of metal or plastic, which I may otherwise term a code plate or graving die, which has at least one planar face, termed the coding area. On this area are formed small sharp projecting cones, burins or sharp ridges, spaced and located with respect to each other to conform to a selected code. The coding area corresponds in dimensions with the size of the blank magnetic record to be encoded by the graving die.

The purpose of the aforesaid projections is to remove from the blank record, by pressure or sliding motion, small portions of the uniform coating of the record, or, alternatively, to deform recognizably, such portions, as by indentation. These irregularities produced in the record can then be scanned by known means for scanning magnetic records and the results printed or tabulated as desired.

Though in most applications the coded graving die will preferably be used to prepare magnetic records, it may also be used to remove portions of a uniform film of any material, for example of a fluorescent material, and such removed portions can be scanned by known optical means.

The coding plates or dies of the invention can be formed by molding them with the aforesaid projections located at the desired points (the die being a "negative" of the markings desired to be applied to the magnetic record), or the dies may be formed by stamping or embossing the opposite surface.

According to my method, the magnetic record is marked by bringing the graving die into superposed contact against the record with such precision that the projections of the coding die will mark the desired index point locations of the record. This may be done manually, or by use of simple holding and registering aids to be described below.

By the use of efficient scanning equipment now available, it has been found that the magnetic records of my prior invention give clear code signals even though only minutely marked or scratched. Accordingly the die of the present invention may be of very small size yet contain a large number of projections representing coded information.

From the foregoing it will be seen that a main advantage of the invention lies in the provision of means whereby anyone without training or skill and without expensive equipment such as punching machinery (the latter requiring constant maintenance), can prepare coded magnetic records representative of the information on the coding dies provided. These records can then be translated automatically by known means into standard punched card or tape codes to operate existing systems. Or, with suitable scanning equipment, they can be used to operate such systems directly.

The encoding graving dies forming the invention, whether made of metal or plastic, are sufficiently rugged to withstand much rough handling, moisture and adverse weather conditions. They can also be stamped out or moulded in large numbers at very low cost. It will therefore be economic to provide identifying dies which can be attached to or packaged with a great variety of objects for the automatic preparation of inventories, sales-records, etc. The invented dies may also be made in the form of personal identity tags for military and other personnel.

Since much coded information can be compressed into a small area, the invented dies can be made in convenient sizes and will retain this information more certainly and under more rigorous conditions of use than can the records which are formed by them; and they may be re-used many times. They can therefore be employed to identify objects or persons under conditions in which it would be impossible to use identifying punched-cards or tapes or magnetic records.

It will be seen, therefore, that the invented code plates or dies may constitute an intermediary device which serves as a link between objects or persons to be identified and modern methods of automatic tabulation and computation. In other words, objects may have their own identifying dies attached to—or packaged with—them and persons may carry their own identifying dies and these dies, by means of intermediate magnetic or optical records, can automatically operate any type of computing or tabulating equipment.

As has been suggested, the recognizable or readable (by machine) coded areas of the record strip may be produced either by (a) actual removal of the coating (as by abrading, scratching or plowing away from each code spot in a direction generally parallel to the coated surface) or by (b) removal in the sense of depressing or embossing the coating so as to make the code-spot region lie beneath the general plane of the coating as presented to the sensing head of a reading or interpreting machine. With the relatively rigid code plate of metal or stiff plastic as contemplated herein, simple manual rubbing, scuffing or embossing motions of the code plate relative to a magnetic coated record strip are adequate to effect the transfer of coded information.

The invention will be further described and explained in connection with the appended drawings, in which.

Figure 1:
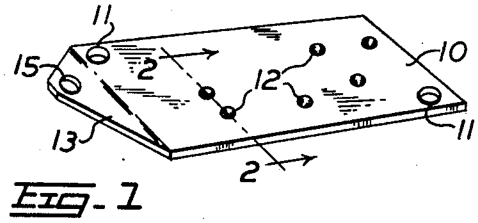
FIG. 1 is a top perspective view of one typical form of code-plate according to the invention.
Figure 2:
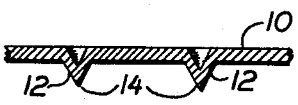
FIG. 2 is an enlarged transverse section thereof taken on line 2—2 of FIG. 1.

FIG. 1 shows a typical code plate 10 formed as a small rectangle of relatively hard and rigid sheet material such as thick plastic (celluloid) or thin metal (aluminum, zinc) which has been locally embossed to form the projections or burins 12 in a pattern conforming to the coded information. This card may also carry printed or written identification material if desired, and for use in certain systems the "code" configurations may themselves be shaped to designate letters or figures which may thus be read either by eye or by machines. As shown in FIG. 2, the embossing produces deformed portions whose outer extremities at 14 are relatively sharp and hard, and eminently suited for either abrading or scratching a relatively softer magnetic coating of a record strip, or locally embossing such a coating, to render the coded information machine-readable. Clearly the plate may be either semi-rigid or even flexible to a degree consistent with its purposes.

Figure 8:
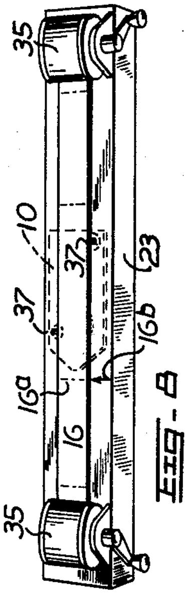
FIG. 8 is a view like FIG. 6 with an alternate form of die-locating means.

In FIG. 1, the code plate or die 10 is illustrated in a convenient shape, the main body of which is useful for the coded area where the projections 12 are located. Plate 10 may also be formed with a pair of holes 11 located along the edges of the coded area, which holes are useful in aligning the code plate with a record strip, when the apparatus shown in FIG. 8 is employed. Where desired, a handling tab 13 may be formed on code plate 10, having a hole 15 for attaching the code plate to an object or person, useful when the code plate constitutes identification, etc., of the object or person. If the code plate 10 is metallic and is used with or to identify another metallic object, some part of plate 10, for example tab 13, may be magnetized so that the plate will adhere to such object. In the case of a plastic plate, tab 13 can be magnetized by applying a permanent magnetic coating thereto.

Code plate 10, if used under circumstances where the sharp projections 11 will come into body contact, may be carried by personnel in a projective bag. Or, a layer of protective adhesive material (not shown) may be applied to the underside of the plate 10 to cover projections 11 and removed when the plate is put into use.

Figures 3, 4, 5, 6:
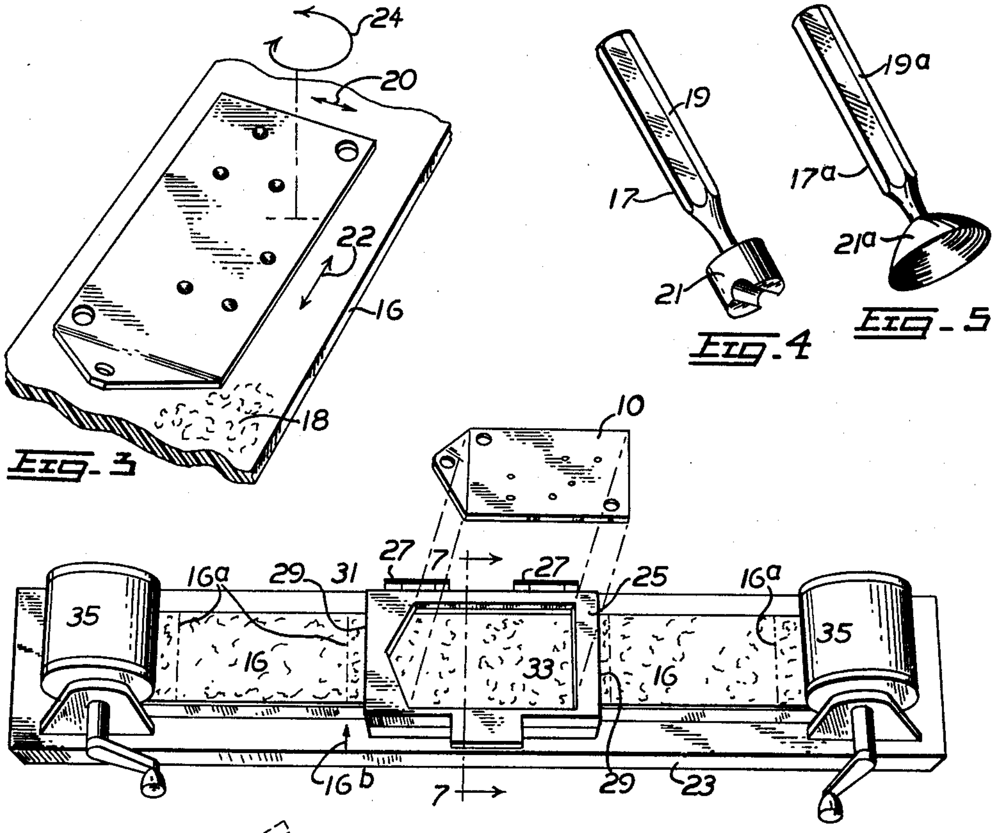
FIG. 3 illustrates schematically some typical modes of accomplishing the transfer of information to a record strip.
FIG. 4 is a perspective view of one form of graving die handling device.
FIG. 5 is a similar view of another form of such handling device.
FIG. 6 is a perspective view of a simple form of recording arrangement, the die being shown in exploded form.

In use, and as illustrated in FIG. 3, the code-plate 10 is placed upon a record strip or sheet 16, of paper, "Mylar" or the like which carries a uniform over-all coating 18 of magnetizable material, such as iron or ferrite particles bound in a set suspending medium which is sufficiently fragile to enable substantially complete removal of the particles by local scuffing or scratching by the "points" or edges 14 of FIG. 2. Alternatively, the material 16 may merely be soft enough to retain a locally embossed replica of the points 14.

The actual transfer of the coded information may be either by embossing pressure between plate 10 and record 16–18, or, as shown in FIG. 3, by lateral scuffing in either or both of directions indicated by arrows 20 and 22, or by an orbital motion as indicated at 24. The only limitation on the amplitude of such motion is that it must prevent the encroachment of transferred markings upon one another; in general, the motion should not be as great as the space devoted to each possible code position. Where a record in continuous strip form is desired, the strip will be fed the necessary distance between transfer operations.

In the handling of the code plates of the invention, and for applying such plates to record strips to transfer information to the latter, it is often useful to employ a simple tool such as shown in FIGS. 4 and 5. In FIG. 4, a pickup tool 17 is shown having a handle 19 and a magnetic pickup head 21 for engagement with code plates 10 of the paramagnetic variety. In FIG. 5, the pickup tool 17*a* has a handle 19*a* to which is affixed a suction-cup pickup head 21*a* for use with a code plate 10 made of plastic. Heads 21 and 21*a* may be formed up to a size substantially co-extensive with that of the plates 10, provided they do not overlap the holes 11 of plate 10, when the latter is being employed with the apparatus of FIG. 8.

Figure 7:
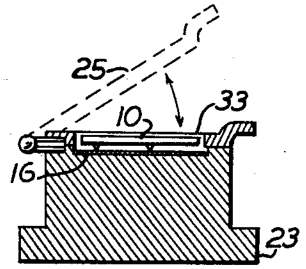
FIG. 7 is a transverse section on line 7—7 of FIG. 6.

A simple form of apparatus for preparing a record strip or record cards, by use of the code plates 10, is shown in FIGS. 6 and 7. This consists of a base support 23 on which a hollow tray 25 is centrally mounted. Tray 25 is provided with sidewalls 31 hinged at 27, and slots 29 at opposite ends. At opposite sides of tray 25 are mounted a pair of crank-operated rolls 35 around which may be trained an elongated record tape 16 of the type to be marked by the code plate 10. This strip is fed through slots 29 by raising sidewalls 31 on hinges 27.

The area 33 formed by sidewalls 31 is by design slightly larger in area than one of the code plates 10, so that a code plate may be fitted into the area 33 and brought into contact with the record strip, so as to permit the marking action within the limits above described for FIG. 3. Obviously, the devices of FIGS. 4 and 5 may be employed to manipulate the code plate 10 in the prescribed manner. Tape 16 may be visibly divided into sections of suitable length by lateral markings 16*a*, which may successively be brought into alignment with a marker point 16*b*, to ensure that each section of the tape 16, as it arrives in the tray 25, is in proper encoding position.

An alternative apparatus is shown in FIG. 8. This is similar to the apparatus of FIGS. 6 and 7, except that tray 27 is supplanted by a pair of upstanding pins 37. These are disposed so as to bring a code plate 10 into proper register with the tape 16 trained between them, the holes 11 of plate 10 being penetrated by pins 37. The diameter of pins 37 is selected so as to be slightly smaller than the diameter of the holes 11 of plates 10, so that, again, the encoding procedure prescribed for FIG. 3 may be accomplished.

The apparatus of FIGS. 6–8 may be employed to make a continuous record on the tape 16 from a plurality of differently encoded plates 10, by moving new sections of tape through tray 25 or into the zone between pins 37. Alternatively, either device may be used to encode a series of record cards, rather than a tape, by locating the cards properly in the tray 25 or on the pins 37.

Figure 9:
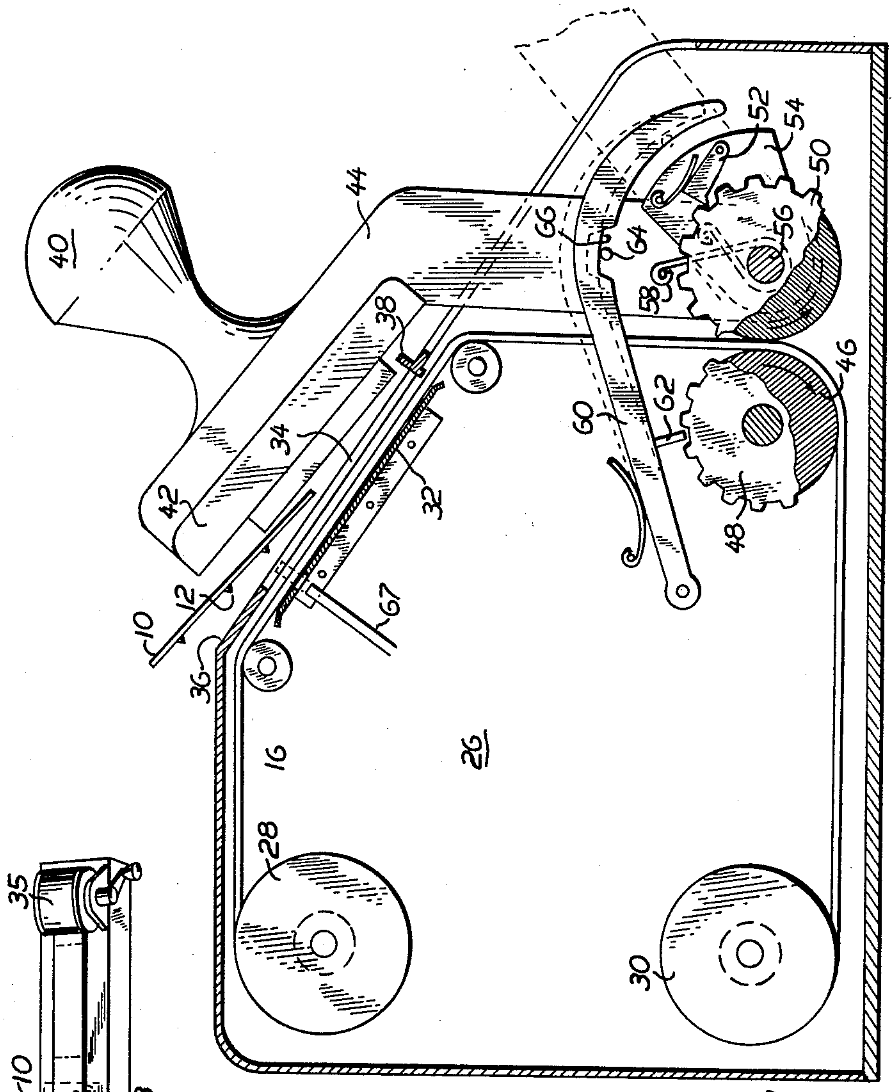
FIG. 9 is a side view in vertical section of a more elaborate form of recording equipment.

A feeding movement as described for FIG. 3 also offers the possibility of an especially simple device for accomplishing both transfer and feed motions. Thus a slight feed motion while the strip and plate are in pressure contact may accomplish the record transfer, while a mere continuation of that motion after release of the contact pressure will present a fresh record face for a subsequent transfer. Such a device is indicated in FIG. 9 as comprising a small cabinet 26 in which the record strip 16 is wound between reels 28 and 30 so as to pass over a backing plate 32 fixed behind a window 34 in the inclined front face or panel 36. Edge guides such as at 38 provide means to locate a code-plate 10 in position at the window, so that it can be pressed against strip 16 by simple manual pressure applied to a knob 40 on the platen 42, carried by opposed parallel swinging arms 44.

Feed rolls 46 for strip 16 are geared together at 48, 50, the latter being driven by a pawl 52 connected to one of the arms 44 so as to feed record material 10 freely during the major part of each full stroke of the arms 44 in the counter-clockwise direction. The code-plate 10 will lie loosely over a strip 16 during this portion of the movement of arms 44. Pawl 52 is carried by an arm 54 coaxial with shaft 56 and connected by hairpin spring 58 to the arm 44.

A detent arm 60 loosely pivoted in the casing 26 has a tooth 62 to engage and prevent motion of gear 48, but the tooth is normally held out of engagement with gear 48 by a pin 64 on arm 44, which pin rides along a concentric surface of the detent arm. As the closing or counter-clockwise movement of arm 44 nears the end of its stroke, so that plate 10 is being clamped against strip 16, pin 64 arrives at notch 66 in the arm 60, and tooth 62 engages gear 48 to stop the feeding motion. Further rotation of arm 44 tensions spring 58, and when pin 64 again lifts detent arm 60, gear 48 rotates slightly under the force of spring 58, to perform the record-transfer operation.

The reverse motion of arms 44 is an idle one, pawl 52 slipping idly along the teeth of gear 50. If desired, an extension 67 of arm 44 within the cabinet may lift the upper edge of code-plate 10 as the opening movement is completed, for easy removal of the plate, and to ensure a full feeding stroke at the next operation; or full-stroke mechanism as conventional in cash register mechanisms may be applied to arms 44.

While the invention has been disclosed herein in connection with certain specific and presently preferred forms, embodiments and procedures, it is not intended by such examples to limit the spirit or breadth of application of the invention, nor to limit it to specific details, except as may be required by the scope of the appended claims.

In the claims which follow, the term "deface," when applied to the coating of the record sheet, is intended to mean a mechanical defacement which physically mars the said coating (but not the record sheet) to an extent sufficient to impair its uniformity in selected positions. These defacements represent the coded information applied to the record sheet.

What is claimed is:

1. The method of recording code data from a plate having spaced code projections thereon, comprising pressing such a plate upon a defaceable coating on a record sheet, with sufficient pressure to locally physically deface said coating in a permanent manner.

2. The method of making a magnetic record of a predetermined code pattern, comprising establishing said pattern as a pattern of projections on a carrier, providing a record sheet having at least a surface coating of magnetic material, and pressing said carrier and said sheet together with a limited scuffing motion to locally displace coating material in a facsimile of said pattern.

3. A coded graving die comprising a sheet of material having at least one major area deformed out of its general planar surface to provide an array of discrete, sharp burins proportioned for the mechanical defacement of a sensitive recording layer in a complementary pattern.

4. Code recording apparatus for use with a coded graving die, comprising a support, guide means on said support for receiving and positioning a die in surface-defacing position relative to a sensitive record material carried by said support, pressure-applying means movable on said support for urging a die into facewise contact with such record material, and means automatically mechanically interconnected with said pressure applying means for feeding such record material in timed relation to the movements of said pressure-applying means.

5. The method of recording data from a plate having spaced code projections thereon, comprising pressing such a plate upon a defaceable coating on a record sheet, and shifting said plate and said sheet laterally relative to one another while the same are pressed together, to locally deface said coating in a permanent manner.

6. The method of recording data from a plate having spaced code projections thereon, comprising pressing such a plate upon a defaceable coating on a record sheet, and while the same are pressed together shifting said plate and said sheet laterally relative to one another in an amplitude smaller than the spacing between said projections, to locally deface said coating in a permanent manner.

7. The method of recording code data from a plate having spaced code projections therein, comprising pressing such a plate upon a defaceable coating of magnetic signal recording material carried by a record sheet with sufficient pressure locally physically to deface said coating in a permanent manner.

8. The method of recording code data from a plate having spaced code projections thereon, comprising pressing such a plate upon a defaceable coating of magnetic signal recording material carried by a record sheet with sufficient pressure physically to produce points of defacement in said coating complementary to the location of said code projections, the defacement being of sufficient extent to enable the electronic scanning thereof.

9. A coded graving die comprising a sheet of material having at least one major area deformed out of its general planar surface to provide an area of discrete, sharp burins so proportioned, when said die is applied to a physically sensitive recording layer of paramagnetic material on a carrier, to mechanically deface said layer to the extent necessary to produce electronically scannnable index points.

10. Code recording apparatus for use with a coded graving die of predetermined dimensions, comprising means for supporting a mechanically sensitive record sheet in flat surface-exposed position, said die and said record sheet having complementary discrete code imparting and receiving index points respectively, and guide means sized and proportioned to receive and position said die into contact with said record sheet, said guide means providing a sufficiently loose fit, in at least one dimension, with respect to the accommodation of said die, to permit a limited facewise scuffing motion of said die across said record sheet, said motion being limited in extent to within the confines of said complementary index points.

References Cited by the Examiner

UNITED STATES PATENTS

| | | | |
|---|---|---|---|
| 1,790,788 | 2/31 | Bauer | 101—291 |
| 2,957,523 | 10/60 | Flieg et al. | 101—19 |
| 3,075,194 | 1/63 | Gray | 346—74 |
| 3,108,742 | 10/63 | Schacht | 234—45 |

FOREIGN PATENTS

| | | |
|---|---|---|
| 2,116 | 7/10 | Great Britain. |

MALCOLM A. MORRISON, *Primary Examiner.*